Feb. 3. 1925.
G. C. DEBAY
1,524,915
APPARATUS FOR FORMING BLOCKS OR BRICKS OF PLASTIC MATERIAL
Filed May 25, 1921
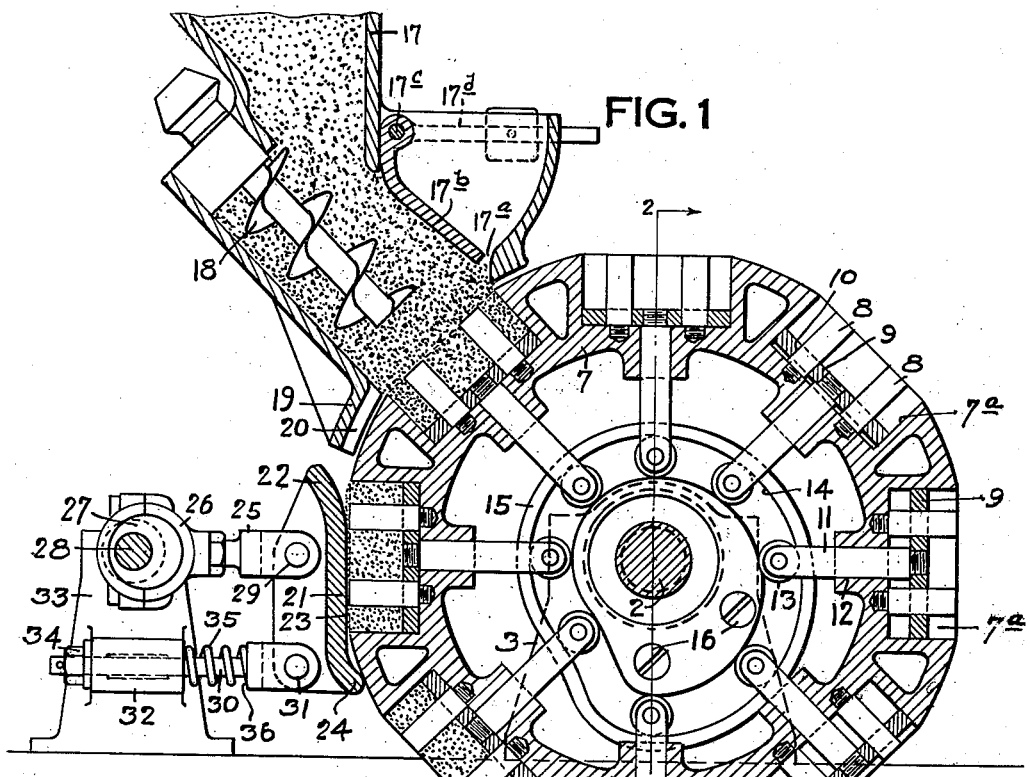
FIG. 1
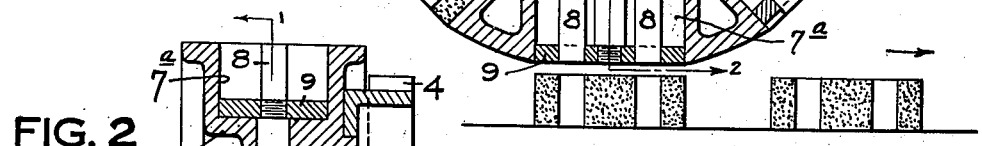
FIG. 2
FIG. 3
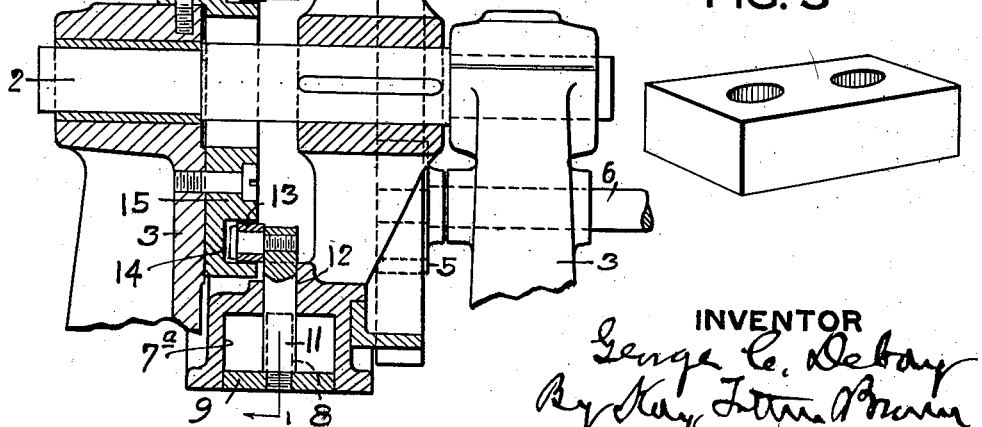
INVENTOR
George C. Debay
By Kay Totten Brown
atty Patented Feb. 3, 1925.

1,524,915

UNITED STATES PATENT OFFICE.

GEORGE C. DEBAY, OF SPRINGDALE, PENNSYLVANIA.

APPARATUS FOR FORMING BLOCKS OR BRICKS OF PLASTIC MATERIAL.

Application filed May 25, 1921. Serial No. 472,316.

*To all whom it may concern:*

Be it known that I, GEORGE C. DEBAY, a citizen of the United States, and resident of Springdale, in the county of Allegheny and State of Pennsylvania, have invented a new and useful Improvement in Apparatus for Forming Blocks or Bricks of Plastic Material; and I do hereby declare the following to be a full, clear, and exact description thereof.

My invention relates to apparatus for forming blocks or bricks of plastic material.

The object of my invention is to provide apparatus by means of which blocks or bricks of plastic material may be formed by delivering the material to the molds in quick succession and compacting the material therein so as to form a compact mass, and then discharging the brick without handling the same by hand, the whole device being automatic in operation and reducing the cost and labor heretofore expended in the making of such blocks or bricks.

To these ends my invention comprises the novel features hereinafter set forth and claimed.

In the accompanying drawings, Fig. 1 is a side elevational view in section of my improved apparatus, the section being taken on the line 1—1, Fig. 2; Fig. 2 is a section on the line 2—2, Fig. 1; and Fig. 3 is a perspective view of one of the finished blocks or bricks.

In the drawing the numeral 2 designates a shaft mounted in suitable standards 3. Mounted on the shaft 2 is a gear wheel 4 which meshes with the pinion 5 on the shaft 6 connected up to a motor or other suitable source of power.

Keyed to the shaft 2 is the rotary frame 7, said frame being circular in form, and formed in the periphery of said frame are the molds or pockets 7ª of the dimensions of the block or brick to be formed. Where the block is to have openings formed therein the frame 7 is provided with the studs or cores 8 which are screwed into seats formed in said frame, or otherwise secured therein.

Within the mold 7 are the stripper plates 9 having openings 10 through which the studs or cores 8 pass, said stripper plates fitting neatly within the mold 7 and adapted to be movable back and forth therein. Connected to the stripper plates 9 are the arms 11, said arms passing through the openings 12 formed in the frame 7. At the inner ends of the arms 11 are the idle rollers 13 which are adapted to engage the camway 14 in the cam 15 secured to one of the standards 3 by the screws 16.

A hopper 17 is provided for delivering the material to the molds as they come around into register with said hopper, and within said hopper is the spiral conveyer 18 which assists in the delivery of the material to the molds and delivers the material positively to the same. This spiral conveyer also acts as a stirrer to keep the material from clogging.

The hopper 17 has the opening 17ª at which is located the compensator 17ᵇ hinged at 17ᶜ. A weighted arm 17ᵈ holds the compensator in the position shown in Fig. 1, viz., so as to press against the material, but in case the material crowds into the mold in too great quantity, said compensator yields and relieves the pressure.

Just beyond the hopper 17 and formed integral therewith, if desired, is the scraper 19 which has the ribs 20 formed thereon which may be arranged diagonally of the molds, so that when the molds travel by said scraper the ribs will even off the material, leaving a certain amount extending beyond the mold and forming a surplus to be tamped or compacted in the mold by the compressing or tamping shoe 21. This shoe 21 has the outwardly extending toe portion 22, the flat portion 23, and the heel 24. To provide for the reciprocation of the shoe 21, said shoe is connected by the arm 25 to the eccentric strap 26 surrounding the eccentric 27 on the shaft 28. To provide flexibility the arm 25 is pivotally connected at 29 to the shoe 21 and the rod 30 is pivotally connected at 31 to said shoe, said rod passing through the guide 32 on the standard 33, the outer end of said rod being provided with the nut 34. A spring 35 is interposed between the guide 32 and the shoulder 36 on said rod. In this manner provision is made for the movement of the shoe to permit the heel 24 to conform to the periphery of the frame 7 and maintain proper contact therewith for the purpose more fully hereinafter set forth.

In the operation of the machine, power is applied to rotate the shaft 2 and with it the frame 7. As the molds come around to register with the hopper 17, the material from which the brick is to be formed is delivered into the mold by gravity, as well as by the positive action of the spiral conveyer 18. The spiral conveyer acts to compact the material in the mold, and, under normal conditions, practically the same pressure will be applied so that each brick will be compacted to substantially the same extent, but in case too great a pressure is set up in the mold by the crowding of the material therein, the compensator 17$^b$ will yield and so relieve the pressure. This forms the subject of an application for Letters Patent filed by me on the 25th day of May, 1921, Serial Number 472,317. As the movement of the frame 7 is preferably continuous, the filling of the mold takes place as the mold passes the hopper, and when the mold passes beyond the hopper the scraper 19 with its ribs 20 in contact with the outer face of the block or brick smooths the outer surface and removes the surplus, but as the ribs 20 are not in direct contact with the periphery of the frame there is a certain surplus of the material which extends beyond the mold, and as the mold travels down to be acted on by the reciprocating shoe 21 the flat portion 23 of said shoe acts to tamp or compact the material, forcing the surplus into the mold to increase the density of the block. Due to the manner in which the shoe 21 is mounted said shoe has a certain amount of flexibility so that the heel 24 which bears constantly against the periphery of the frame 7 will move over the flat face of the brick and even it off after the tamping operation of the shoe 21. When the block passes beyond the shoe 21 the camway 14 is so formed that the arm 11 connected to the stripper plate 9 will be forced outwardly, so that when the mold reaches the position indicated at the bottom of Fig. 1 the stripper plate will have moved so as to discharge the block on to a conveyer or support below. As the brick is confined by the walls of the mold during the stripping operation the movement of the block will be equal at all points, so that there will be no tendency to distort or mar the brick in its withdrawal from the cores 8.

It is apparent that the construction may be modified and changed in different ways and still come within the scope of the appended claims.

What I claim is:

1. In apparatus for forming blocks of plastic or like material, the combination of a circular rotary frame having molds in its periphery, means for rotating said frame, a stripper plate in each of said molds, means for moving said stripper plates, a reciprocating tamping shoe in proper relation to the periphery of said frame, and a heel on said shoe adapted to engage exposed surfaces of the blocks to even the same.

2. In apparatus for forming blocks of plastic or like material, the combination of a circular rotary frame having mold cavities on its periphery, means for rotating said frame, means for feeding material into said cavities, a reciprocating tamping shoe resiliently mounted adjacent to the periphery of said frame, and means for reciprocating said shoe, said shoe having an outwardly extending toe portion, an intermediate flat tamping portion, and a heel portion for evening off the material after the tamping operation.

3. In apparatus for forming blocks of plastic material, the combination of a circular rotary frame having mold cavities in its periphery, means for supplying the material to said cavities, and a tamping shoe for compressing said material within the cavities, the said shoe being pivoted intermediate its ends, and having a heel portion formed on one of its ends for evening off the material after tamping.

4. In apparatus for forming blocks of plastic material, the combination of a rotary member having mold cavities in its periphery for reception of material to be molded, a tamping member for said material, means for pivotally supporting said tamping member, adjacent to one of its ends, a heel portion adjacent to the other end of said tamping member, and means for yieldingly holding said heel portion against the outer edges of said mold cavities.

5. In apparatus for forming blocks of plastic material, the combination of a rotary frame having model cavities on its periphery, means for supplying molding material to said cavities, a tamping shoe for said material, and an eccentric device for reciprocating said shoe toward and from said mold cavities, a heel portion on one end of said shoe, and means for holding said heel portion in engagement with the periphery of said frame after each tamping operation.

In testimony whereof, I, the said GEORGE C. DEBAY, have hereunto set my hand.

GEORGE C. DEBAY.

Witnesses:
ROBT. D. TOTTEN,
JOHN F. WILL.